(12) United States Patent
Yamaguchi

(10) Patent No.: US 12,529,941 B2
(45) Date of Patent: Jan. 20, 2026

(54) CAMERA MODULE

(71) Applicant: DENSO CORPORATION, Kariya (JP)

(72) Inventor: Kazuma Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 18/188,296

(22) Filed: Mar. 22, 2023

(65) Prior Publication Data

US 2023/0324771 A1 Oct. 12, 2023

(30) Foreign Application Priority Data

Apr. 1, 2022 (JP) .................... 2022-061854

(51) Int. Cl.
*G03B 17/02* (2021.01)
*B60R 11/00* (2006.01)
*B60R 11/04* (2006.01)

(52) U.S. Cl.
CPC .............. *G03B 17/02* (2013.01); *B60R 11/04* (2013.01); *B60R 2011/0026* (2013.01)

(58) Field of Classification Search
CPC ................................ G03B 17/02; B60R 11/04
See application file for complete search history.

(56) References Cited

U.S. PATENT DOCUMENTS

| | | | |
|---|---|---|---|
| 5,998,862 A | 12/1999 | Yamanaka | |
| 6,147,389 A * | 11/2000 | Stern | H01L 27/14618 |
| | | | 257/434 |
| 7,352,402 B2 * | 4/2008 | Fujimoto | G02B 7/021 |
| | | | 348/340 |
| 2014/0313337 A1 * | 10/2014 | Devota | B60R 11/04 |
| | | | 348/148 |

FOREIGN PATENT DOCUMENTS

| | | | |
|---|---|---|---|
| JP | 2004-146946 A | | 5/2004 |
| JP | 2006-330121 A | | 12/2006 |
| JP | 2009-003130 A | | 1/2009 |
| JP | 2012113185 A | * | 6/2012 |
| JP | 6193099 B2 | | 9/2017 |
| JP | 2021-047348 A | | 3/2021 |

OTHER PUBLICATIONS

Mitsubishi Materials Electronic Chemicals Co., Ltd., High UV transparency black pigment UB-2, website: https://www.mmc-ec.co.jp/library/format_nitrblack.html.
Tokushiki Co.,Ltd, What is UV (ultraviolet) transparent black dispersion? Explaining the characteristics, types, and uses, Mar. 15, 2019, website: https://www.orizuru.co.jp/media/technical_information/microparticulation_technology/a33.

\* cited by examiner

*Primary Examiner* — Minh Q Phan
(74) *Attorney, Agent, or Firm* — Maschoff Brennan

(57) ABSTRACT

A camera module includes at least one lens, a camera substrate, a lens holder and a joining member. The lens holder is formed of a material not transparent to visible light, and has a lens-holding part and a base part. The lens-holding part is formed in a tubular shape and holds the at least one lens therein. The base part is also formed in a tubular shape and located closer to the camera substrate than the lens-holding part is in an optical axis direction. The joining member is formed of a UV-curable resin, and provided at a location where the camera substrate is joined to the base part of the lens holder or at a location where the lens-holding part and the base part of the lens holder are joined to each other. At least a facing portion of the lens holder, which faces the joining member, has UV transparency.

16 Claims, 5 Drawing Sheets

CAMERA MODULE

CROSS-REFERENCE TO RELATED APPLICATION

This application is based on and claims priority from Japanese Patent Application No. 2022-061854 filed on Apr. 1, 2022, the entire contents of which are hereby incorporated by reference into this application.

BACKGROUND

1 Technical Field

The present disclosure relates to camera modules.

2 Description of Related Art

There is known a solid-state imaging apparatus having a lens barrel joined to a semiconductor chip in which a solid-state imaging element is provided. Specifically, the semiconductor chip, which constitutes a main body of the solid-state imaging apparatus, has a light-receiving section of the solid-state imaging element provided on a central area of an upper surface thereof. The surrounding area of the light-receiving section on the upper surface of the semiconductor chip constitutes a joining region. The lens barrel has a lens held therein. A lower end portion of the lens barrel is jointed to the joining region of the semiconductor chip by an adhesive such as a thermosetting resin.

The joining region of the semiconductor chip is formed flat. On the other hand, the lower end portion of the lens barrel includes a plurality of focus-positioning bosses that are formed, on a lower end surface of the lens barrel which is parallel to the joining region of the semiconductor chip, to protrude downward. The focus-positioning bosses are arranged at predetermined intervals in a direction around an optical axis of the lens over the entire circumference of the lower end portion of the lens barrel. Moreover, the focus-positioning bosses are formed on a radially inner area of the lower end surface of the lens barrel; and the adhesive is applied to a radially outer area of the lower end surface of the lens barrel. The focus-positioning bosses are molded integrally with the lens barrel. The lens barrel is formed of a thermoplastic synthetic resin whose melting point is lower than or equal to 120° C., such as a polycarbonate resin. Distal end portions of the focus-positioning bosses are placed to abut the joining region of the semiconductor chip and partially melted by heating.

A method of manufacturing the known solid-state imaging apparatus includes a joining step. In the joining step, the semiconductor chip, which has the solid-state imaging element provided therein, is heated in advance by a heater or the like to a temperature of about 100° C.-120° C. Further, the positioning of both a center of the lens and a center of the light-receiving section of the solid-state imaging element is performed so that the lens barrel is arranged above the semiconductor chip, which constitutes the main body of the solid-state imaging apparatus, with the center of the lens located at a desired position. Then, the lens barrel is moved downward, causing the distal end portions of the focus-positioning bosses to be pressed against the joining region of the heated semiconductor chip. Consequently, the distal end portions of the focus-positioning bosses are heated and thus partially melted by heat transferred from the joining region of the semiconductor chip, thereby being deformed depending on the pressed position. Thereafter, the lens barrel is further pressed downward until the lens is placed at a desired position in a focus depth direction thereof; thus, the lens barrel is temporarily fixed to the semiconductor chip. Next, the adhesive is applied around the focus-positioning bosses between the lower end surface of the lens barrel and the joining region of the semiconductor chip. Then, the adhesive is cured by heating. As a result, the lens barrel and the semiconductor chip are completely fixed to each other.

SUMMARY

According to the present disclosure, there is provided a first camera module which includes at least one lens, a camera substrate, a lens holder and a joining member. The at least one lens has an optical axis. The camera substrate includes an imaging element arranged on the optical axis of the at least one lens. The lens holder is formed of a material not transparent to visible light. The lens holder has a lens-holding part and a base part. The lens-holding part is formed in a tubular shape around the optical axis and holds the at least one lens therein. The base part is also formed in a tubular shape around the optical axis and located closer to the camera substrate than the lens-holding part is in an optical axis direction in which the optical axis extends. The joining member is formed of a UV-curable resin. The joining member is provided at a location where the camera substrate is joined to the base part of the lens holder or at a location where the lens-holding part and the base part of the lens holder are joined to each other. Moreover, at least a facing portion of the lens holder, which faces the joining member, has UV transparency.

According to the present disclosure, there is also provided a second camera module which includes at least one lens, a camera substrate, a lens holder and a joining member. The at least one lens has an optical axis. The camera substrate includes an imaging element arranged on the optical axis of the at least one lens. The lens holder is formed of a material not transparent to visible light. The lens holder has a lens-holding part and a base part. The lens-holding part is formed in a tubular shape around the optical axis and holds the at least one lens therein. The base part is also formed in a tubular shape around the optical axis and located closer to the camera substrate than the lens-holding part is in an optical axis direction in which the optical axis extends. The joining member is formed of a UV-curable resin and joins an outer peripheral portion of the camera substrate in an in-plane direction of the camera substrate to an inner wall surface of the base part of the lens holder. The in-plane direction of the camera substrate intersects the optical axis. The inner wall surface of the base part faces the optical axis.

DESCRIPTION OF EMBODIMENTS

Figure 1:
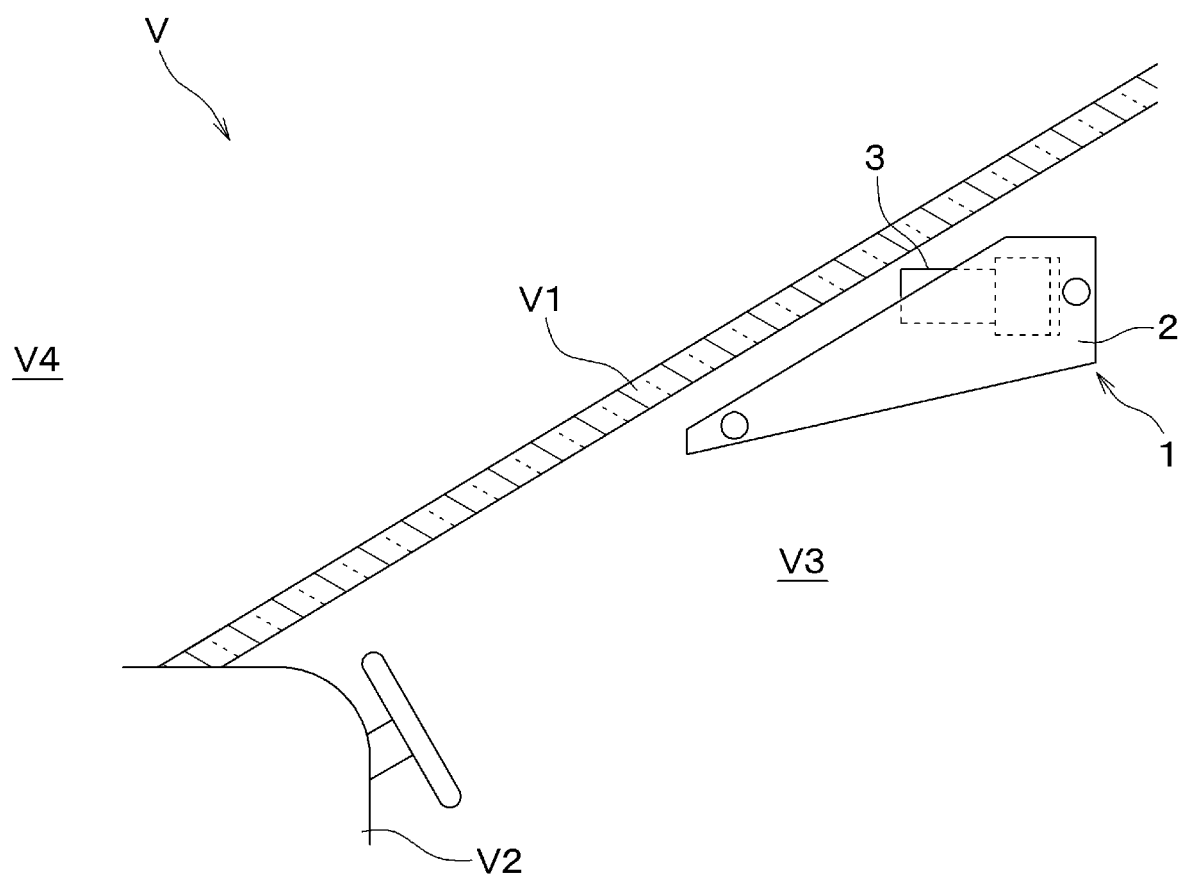
FIG. 1 is a partially cross-sectional side view of part of a vehicle in which a camera module according to an exemplary embodiment is installed.

As described above, in manufacturing the known solid-state imaging apparatus (see, for example, Japanese Patent Application Publication No. JP2004146946A), the focus of the lens is positioned by thermal deformation of the focus-positioning bosses provided in the lower end portion of the lens barrel; and the lens barrel and the semiconductor chip are joined to each other by applying the adhesive, which is formed of a thermosetting resin, around the focus-positioning bosses and curing the adhesive by heating. Consequently, deviation in the position of the focus of the lens may be caused by thermal shrinkage of the adhesive with decrease in the temperature thereof after the joining step.

The present disclosure has been accomplished in view of the above problem.

In each of the above-described first and second camera modules according to the present disclosure, the positional relationship between the lens holder and the camera substrate in the optical axis direction is not affected by cure shrinkage of the joining member (i.e., the UV-curable resin) in the optical axis direction. Moreover, since the joining member is formed of the UV-curable resin, no thermal process is required for curing the joining member. Consequently, it becomes unnecessary to consider thermal deformation of the joining member which would be caused, if a thermal process was performed for curing the joining member, during the heating and cooling of the joining member. As a result, it becomes possible to effectively suppress the performance of the camera module from being lowered due to deviation in the position of a focus of the at least one lens caused by cure shrinkage of the joining member in the assembly process of the camera module.

In further implementations of the above-described first camera module according to the present disclosure, the joining member may join the lens-holding part and the base part of the lens holder to each other. The base part of the lens holder may have a joining member-supporting protrusion formed to protrude in a direction intersecting the optical axis. The joining member may be formed to adjoin the joining member-supporting protrusion in the optical axis direction.

Further, the joining member may be interposed between a proximal end portion of the lens-holding part and the base part in the direction intersecting the optical axis; the proximal end portion is a camera-substrate-side end portion of the lens-holding part in the optical axis direction. The joining member-supporting protrusion may protrude from the base part toward the proximal end portion of the lens-holding part in the direction intersecting the optical axis.

Otherwise, the joining member may join an outer peripheral portion of the camera substrate in an in-plane direction of the camera substrate to an inner wall surface of the base part of the lens holder. The in-plane direction of the camera substrate intersects the optical axis. The inner wall surface of the base part faces the optical axis.

In further implementations of the above-described second camera module according to the present disclosure, the camera substrate may have an element-supporting surface on which the imaging element is provided and an end surface intersecting the element-supporting surface and included in the outer peripheral portion of the camera substrate. The joining member may be interposed between the end surface of the camera substrate and the inner wall surface of the base part of the lens holder.

In the lens holder, at least the base part may have UV transparency.

The base part of the lens holder may have a joining member-supporting protrusion formed to protrude from the inner wall surface of the base part toward the optical axis. The joining member may be formed to adjoin the joining member-supporting protrusion in the optical axis direction.

In further implementations of the above-described first and second camera modules according to the present disclosure, the lens-holding part of the lens holder may have UV transparency. The at least one lens may be fixed, by a lens-fixing member that is formed of a UV-curable resin, to a lens-supporting wall surface of the lens-holding part of the lens holder. The lens-supporting wall surface is an inner wall surface of the lens-holding part which faces the optical axis.

Further, the lens-holding part of the lens holder may have at least one lens-fixing protrusion formed to protrude from the lens-supporting wall surface of the lens-holding part toward the optical axis. The lens-fixing member may be formed to adjoin the at least one lens-fixing protrusion in the optical axis direction.

Moreover, each of the above-described first and second camera modules according to the present disclosure may be mounted inside a windshield of a vehicle to capture images of an external environment of the vehicle.

Hereinafter, one exemplary embodiment will be described with reference to FIGS. 1 and 2.

In addition, if various modifications applicable to the exemplary embodiment are inserted in the explanation of the exemplary embodiment, it may become difficult to understand the exemplary embodiment. Therefore, various modifications will be described after completion of the explanation of the exemplary embodiment. Moreover, the drawings include only schematic diagrams necessary for understanding the configurations and functions of camera modules according to the present disclosure, but do not necessarily represent the design specifications of camera modules actually manufactured and sold in the market.

FIG. 1 shows part of a windshield V1 of a vehicle V and an imaging apparatus 1 mounted to the windshield V1.

As shown in FIG. 1, the vehicle V is a motor vehicle which has the windshield V1 and a dashboard V2 provided in a front part of the vehicle body. By the windshield V1 provided above the dashboard V2, a passenger compartment V3 of the vehicle V is separated from an external environment V4 in front of the vehicle V.

The imaging apparatus 1 is mounted inside the windshield V1 and configured to capture images of the external environment V4 in front of the vehicle V. That is, the imaging apparatus 1 is a so-called front camera apparatus which is mounted, from the inside of the passenger compartment V3, to a bracket (not shown) or the like fixed to the windshield V1.

The imaging apparatus 1 includes a camera case 2 and a camera module 3 according to the present embodiment. The camera case 2 is made of a metal or synthetic resin, and box-shaped. Specifically, the camera case 2 has a shape such that the thickness (or the height dimension) thereof decreases in a forward direction. The camera module 3 is fixed in the camera case 2.

Hereinafter, the configuration of the camera module 3 according to the present embodiment will be described in detail with reference to FIG. 2.

Figure 2:
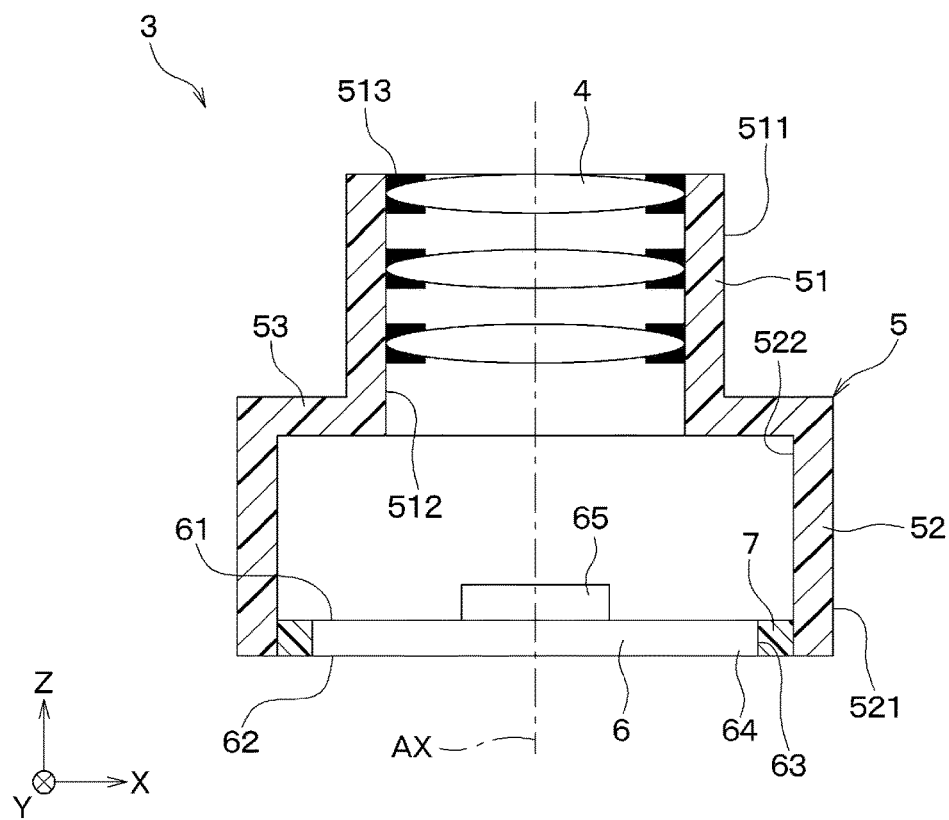
FIG. 2 is a cross-sectional view of the camera module according to the exemplary embodiment.

In addition, for the sake of convenience of explanation, as shown in FIG. 2, an X-Y-Z three-dimensional coordinate system is set such that the Z axis is parallel to an optical axis AX of the camera module 3.

As shown in FIG. 2, the camera module 3 includes at least one lens 4, a lens holder 5, a camera substrate 6 and a joining member 7.

More particularly, in the present embodiment, the camera module 3 has a plurality (e.g., four) lenses 4 arranged along the optical axis AX that extends straight. That is, the lenses 4 are arranged on the optical axis AX. In other word, the optical axis AX of the camera module 3 is represented by the optical axis of the lenses 4.

The lens holder 5 has a lens-barrel part 51, a base part 52 and a connecting part 53.

The lens-barrel part 51 is formed in a tubular shape around the optical axis AX. The lens-barrel part 51 holds the lenses 4 therein. More particularly, in the present embodiment, the lens-barrel part 51 is formed in the shape of a cylinder whose central axis coincides with the optical axis AX. In addition, the lens-barrel part 51 corresponds to a "lens-holding part" in the claims.

The base part 52 is also formed in a tubular shape (more particularly, a cylindrical shape in the present embodiment) around the optical axis AX. The base part 52 is located closer to the camera substrate 6 than the lens-barrel part 51 is in the optical axis direction (i.e., the direction in which the optical axis AX extends). In the present embodiment, the base part 52 has the same wall thickness as the lens-barrel part 51, but larger inner and outer diameters than the lens-barrel part 51.

The connecting part 53 is formed to connect an end (i.e., the lower end in FIG. 2) of the lens-barrel part 51 and an end (i.e., the upper end in FIG. 2) of the base part 52 in the optical axis direction. More particularly, in the present embodiment, the connecting part 53 is formed so that in a plan view along the optical axis direction, it is flat plate-shaped or cone-shaped and has a substantially circular opening with the same inner diameter as the lens-barrel part 51.

The lens holder 5 is formed of a material that is not transparent (i.e., is opaque) to visible light. Moreover, in the present embodiment, the lens holder 5 is configured so that at least the base part 52 of the lens holder 5 has UV transparency (i.e., is transparent to ultraviolet light).

More particularly, in the present embodiment, the lens holder 5 is formed of a synthetic resin colored by a black pigment having UV transparency (e.g., a highly UV-transparent black pigment manufactured by Mitsubishi Materials Electronic Chemicals Co., Ltd., such as UB-1 or the like); and the lens holder 5 is seamlessly formed into one piece. That is, in the present embodiment, the entire lens holder 5 is formed of a material that can block visible light while allowing ultraviolet light for curing a UV-curable resin to pass therethrough. Here, the UV-curable resin denotes a resin curable by ultraviolet light.

The camera substrate 6 is thin plate-shaped and arranged such that a plate thickness direction thereof is parallel to the optical axis AX. The camera substrate 6 has an element-supporting surface 61, a back surface 62 and an end surface 63.

The element-supporting surface 61 and the back surface 62 constitute a pair of major surfaces of the camera substrate 6. The element-supporting surface 61 and the back surface 62 are parallel to each other and exposed respectively in opposite directions.

In addition, the "major surfaces" of a plate-shaped member generally denote a pair of surfaces thereof whose normal direction is parallel to the plate thickness direction; the "major surfaces" may also be referred to as the "plate surfaces".

The end surface 63 intersects both the element-supporting surface 61 and the back surface 62. More particularly, in the present embodiment, the end surface 63 is formed as a surface perpendicular to both the element-supporting surface 61 and the back surface 62.

Hereinafter, directions parallel to the element-supporting surface 61 and the back surface 62 (i.e., directions parallel to the X-Y plane in FIG. 2) will be referred to as "in-plane directions" of the camera substrate 6. The "in-plane directions" include "radial directions" and a "circumferential direction". The "radial directions" denote the extending directions of half-lines that extend, on an imaginary plane perpendicular to the optical axis AX, from the intersection point between the imaginary plane and the optical axis AX. In other words, the "radial directions" denote the radial directions of an imaginary circle that is drawn in the above imaginary plane with its center located at the intersection point between the imaginary plane and the optical axis AX. On the other hand, the "circumferential direction" denotes the circumferential direction of the above imaginary circle. In addition, an outer peripheral portion 64 of the camera substrate 6 in the in-plane directions includes the end surface 63 and its vicinities.

An imaging element 65 is provided on the element-supporting surface 61 of the camera substrate 6. The imaging element 65 may be implemented by a solid-state imaging element such as a CMOS or CCD imaging element. Here, CMOS stands for "Complementary Metal Oxide Semiconductor"; and CCD stands for "Charge Coupled Device".

The imaging element 65 is arranged on the optical axis AX. That is, the imaging element 65 is mounted to the camera substrate 6 so as to be located at a position where light from the external environment V4, which has passed through the lenses 4, forms an image in the camera module 3.

Next, the mounting structure of the lenses 4 and the camera substrate 6 to the lens holder 5 will be described in detail.

As shown in FIG. 2, the lens-barrel part 51 of the lens holder 5 has an outer wall surface 511 exposed to outside of the camera module 3, and a lens-supporting wall surface 512 that is an inner wall surface facing inside of the camera module 3 (i.e., facing the optical axis AX). The lenses 4 are fixed to the lens-supporting wall surface 512 of the lens-barrel part 51 of the lens holder 5 by a lens-fixing member 513; the lens-fixing member 513 is formed of an adhesive.

On the other hand, the base part 52 of the lens holder 5 has an outer wall surface 521 exposed to outside of the camera module 3, and an inner wall surface 522 facing inside of the camera module 3 (i.e., facing the optical axis AX). The outer peripheral portion 64 of the camera substrate 6 is joined to the inner wall surface 522 of the base part 52 of the lens holder 5 by a joining member 7; the joining member 7 is formed of a UV-curable resin (or UV-curable adhesive). That is, the joining member 7 is provided at a location where the camera substrate 6 is joined to the base part 52 of the lens holder 5. More specifically, the joining member 7 is provided between the end surface 63 of the camera substrate 6 and the inner wall surface 522 of the base part 52 of the lens holder 5.

Next, an assembly process of the camera module 3 will be described together with advantageous effects achievable with the configuration of the camera module 3 according to the present embodiment.

First, the lens holder 5 having the lenses 4 fixed thereto by the lens-fixing member 513 and the camera substrate 6 having circuit elements provided therein are prepared. The circuit elements provided in the camera substrate 6 include the imaging element 65.

Then, the camera substrate 6 is assembled to the lens holder 5 with the imaging element 65 oriented toward the lenses 4. Specifically, the camera substrate 6 is inserted into the base part 52 of the lens holder 5 so that the end surface 63 of the camera substrate 6 faces a distal end portion (i.e., an end portion on the side further from the lenses 4 in the optical axis direction) of the inner wall surface 522 of the base part 52.

Further, the positioning of a focus of the lenses 4 is performed so that a light-receiving surface of the imaging element 65 is located in the optical axis direction at the position of the focus. In other words, the focus of the lenses 4 is located on the light-receiving surface of the imaging element 65.

Thereafter, the UV-curable resin, which forms the joining member 7, is filled between the end surface 63 of the camera substrate 6 and the inner wall surface 522 of the base part 52 of the lens holder 5 and cured by being exposed to ultraviolet light. Consequently, the lens holder 5 and the camera substrate 6 are joined to each other.

In a comparative example, a lower end surface of the base part 52 of the lens holder 5 and the element-supporting surface 61 of the camera substrate 6 (i.e., the upper major surface of the camera substrate 6 in FIG. 2) are joined to each other by the joining member 7. In this case, the performance of the camera module 3 and thus the performance of the imaging apparatus 1 may be lowered due to deviation in the position of the focus of the lenses 4 caused by cure shrinkage of the joining member 7 (i.e., the UV-curable resin) in the optical axis direction.

In contrast, in the camera module 3 according to the present embodiment, the joining member 7 is provided between the end surface 63 of the camera substrate 6 and the inner wall surface 522 of the base part 52 of the lens holder 5. That is, the distal end portion (i.e., the end portion joined to the camera substrate 6) of the base part 52 of the lens holder 5, the joining member 7 and the outer peripheral portion 64 of the camera substrate 6 are aligned not in the optical axis direction, but in an in-plane direction (more particularly, a radial direction in the present embodiment) of the camera substrate 6 perpendicular to the optical axis direction. Therefore, the positional relationship between the lens holder 5 and the camera substrate 6 in the optical axis direction is not affected by cure shrinkage of the joining member 7 (i.e., the UV-curable resin) in the optical axis direction. Moreover, since the joining member 7 is formed of the UV-curable resin, no thermal process is required for curing the joining member 7. Consequently, it becomes unnecessary to consider thermal deformation of the joining member 7 which would be caused, if a thermal process was performed for curing the joining member 7, during the heating and cooling of the joining member 7. As a result, it becomes possible to effectively suppress the performance of the camera module 3 from being lowered due to deviation in the position of the focus of the lenses 4 caused by cure shrinkage of the joining member 7 in the assembly process of the camera module 3.

Moreover, the UV-curable resin, which forms the joining member 7, may be cured by irradiating ultraviolet light thereto from, for example, the lower side or an obliquely lower side in FIG. 2. In the present embodiment, at least the base part 52 of the lens holder 5 has UV transparency. Therefore, the UV-curable resin may also be cured by irradiating ultraviolet light thereto from the lateral side or the obliquely upper side in FIG. 2. Consequently, with the configuration of the camera module 3 according to the present embodiment, the degree of freedom of the process of irradiating ultraviolet light (i.e., the process of exposing the UV-curable resin to ultraviolet light) is improved. As a result, it becomes possible to facilitate the manufacture of the camera module 3.

While the above particular embodiment has been shown and described, it will be understood by those skilled in the art that the present disclosure is not limited to the embodiment and various modifications, changes and improvements may be made without departing from the spirit of the present disclosure.

For example, in the above-described embodiment, the imaging apparatus 1 is configured as a front camera apparatus of the vehicle V. Alternatively, the imaging apparatus 1 may be configured as a rear camera apparatus, a side camera apparatus, or a camera apparatus that captures images of objects in the passenger compartment V3 of the vehicle V.

In the above-described embodiment, the imaging apparatus 1 is configured as a monocular camera apparatus that includes only a single camera module 3. Alternatively, the imaging apparatus 1 may be configured as a compound-eye camera apparatus that includes two or more camera modules 3.

In the above-described embodiment, the camera module 3 includes four lenses 4. However, the number of the lenses 4 included in the camera module 3 is not limited to four and may alternatively be set to a different number such as one, two, three or five.

In the above-described embodiment, the camera module 3 is configured such that the imaging element 65 directly faces the lenses 4 in the optical axis direction without any member interposed therebetween. Alternatively, an optical element (e.g., an optical filter) may be interposed between the imaging element 65 and the lenses 4 in the optical axis direction.

In the above-described embodiment, each of the lens-barrel part 51 and the base part 52 of the lens holder 5 is cylindrical-shaped. In other words, each of the lens-barrel part 51 and the base part 52 of the lens holder 5 has the shape of a tube with a circular cross section. However, the shape of the lens holder 5 is not limited to the shape shown in FIG. 2. For example, each of the lens-barrel part 51 and the base part 52 of the lens holder 5 may alternatively have the shape of a tube with a polygonal (e.g., quadrangular or hexagonal) cross section or an elliptical cross section.

In the above-described embodiment, in the lens holder 5, the base part 52 has larger inner and outer diameters than the lens-barrel part 51; and the connecting part 53 is provided between the lens-barrel part 51 and the base part 52 to connect them with each other. Alternatively, the lens-barrel part 51 and the base part 52 may have the same inner and outer diameters; and the connecting part 53 may be omitted from the configuration of the lens holder 5. In other words, the lens holder 5 may be formed of a single tube with constant inner and outer diameters. In this case, the lens-barrel part 51 may be constituted of a first part of the single tube on one side in the optical axis direction; and the base part 52 may be constituted of a second part of the single tube on the other side in the optical axis direction.

Figure 3:
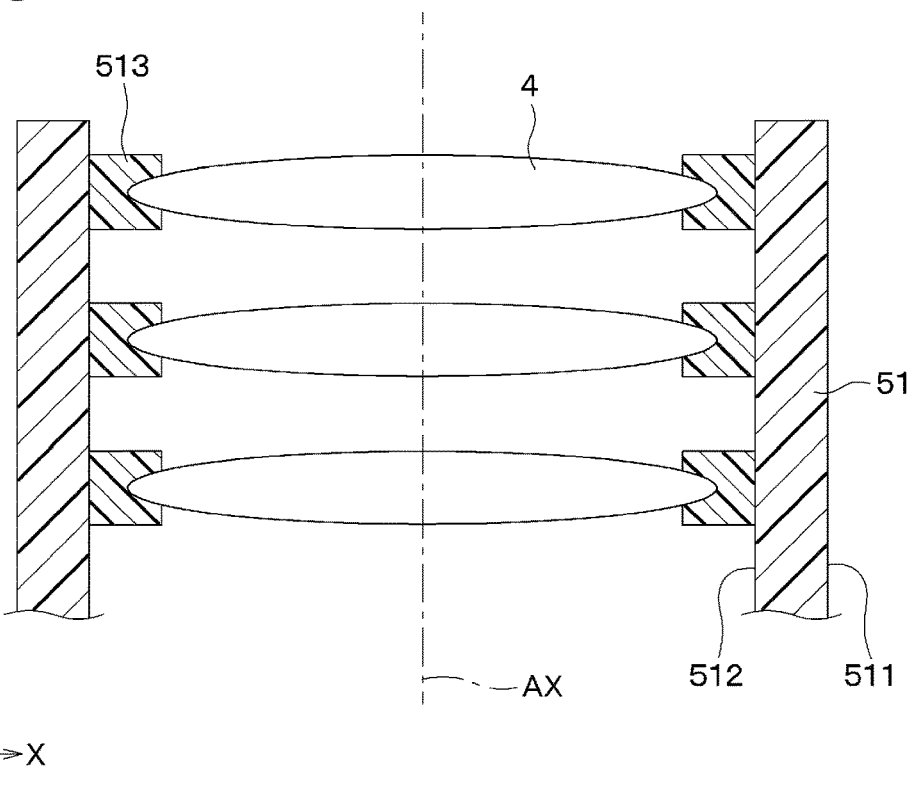
FIG. 3 is an enlarged cross-sectional view of a lens-barrel part of a lens holder of a camera module according to a modification.

Referring to FIG. 3, the lens-barrel part 51 of the lens holder 5 may have UV transparency; and the lens-fixing member 513 may be formed of a UV-curable resin (or UV-curable adhesive). In this case, the UV-curable resin, which forms the lens-fixing member 513, may be first applied between the lenses 4 and the lens-supporting wall surface 512 of the lens-barrel part 51 of the lens holder 5; then, the UV-curable resin may be cured by irradiating ultraviolet light thereto from outside of the lens-barrel part 51.

Figure 4:
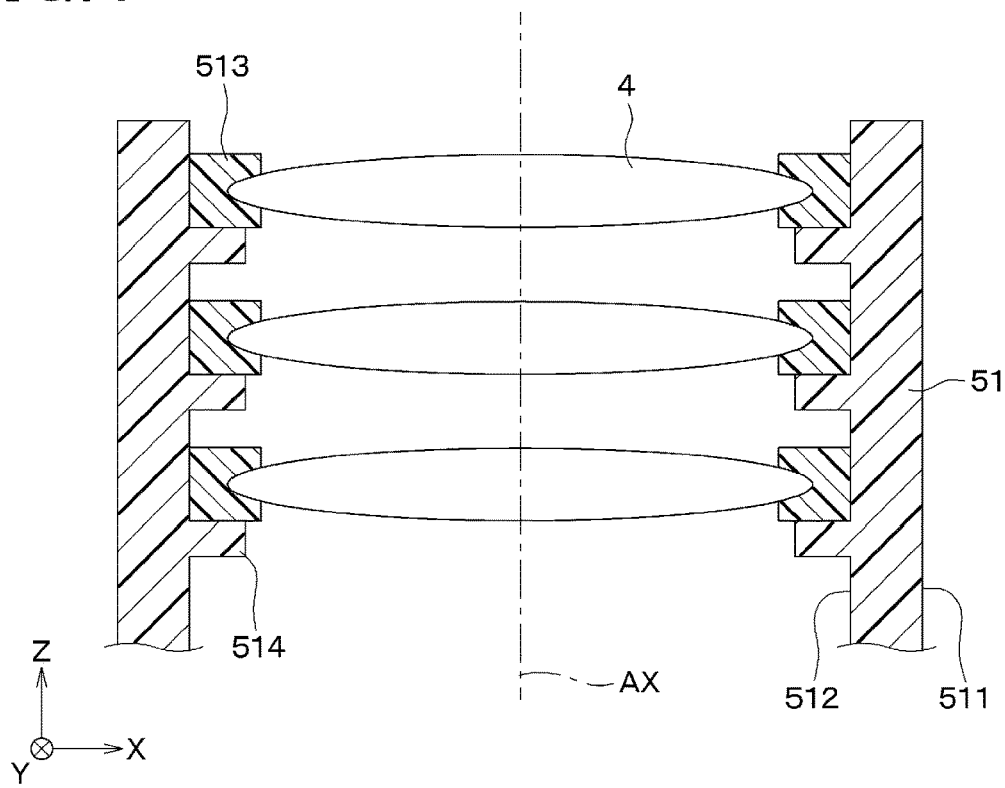
FIG. 4 is an enlarged cross-sectional view of a lens-barrel part of a lens holder of a camera module according to another modification.

Moreover, in the above case, the lens-barrel part 51 of the lens holder 5 may be configured to further have lens-fixing protrusions 514 as shown in FIG. 4. Each of the lens-fixing protrusions 514 protrudes from the lens-supporting wall surface 512 of the lens-barrel part 51 toward the optical axis AX (i.e., radially inward). Further, each of the lens-fixing protrusions 514 may be formed continuously in the circumferential direction. In other words, each of the lens-fixing protrusions 514 may be formed over the entire circumference of the lens-supporting wall surface 512 of the lens-barrel part 51. Furthermore, the lens-fixing member 513 may have a plurality of portions each of which is formed to adjoin a corresponding one of the lens-fixing protrusions 514 in the optical axis direction. Consequently, the lens-fixing protrusions 514 can serve as anti-drip protrusions to prevent dripping of the UV-curable resin before it is cured.

In the above-described embodiment, the entire lens holder 5 has UV transparency. Alternatively, the lens holder 5 may be configured so that only the portion thereof facing the joining member 7 (i.e., the portion fixed to the joining member 7) has UV transparency. In this case, as shown in FIGS. 5A and 5B, the lens-barrel part 51 and the base part 52 may be formed of different materials separately and then assembled together to form the lens holder 5.

Figure 5A:
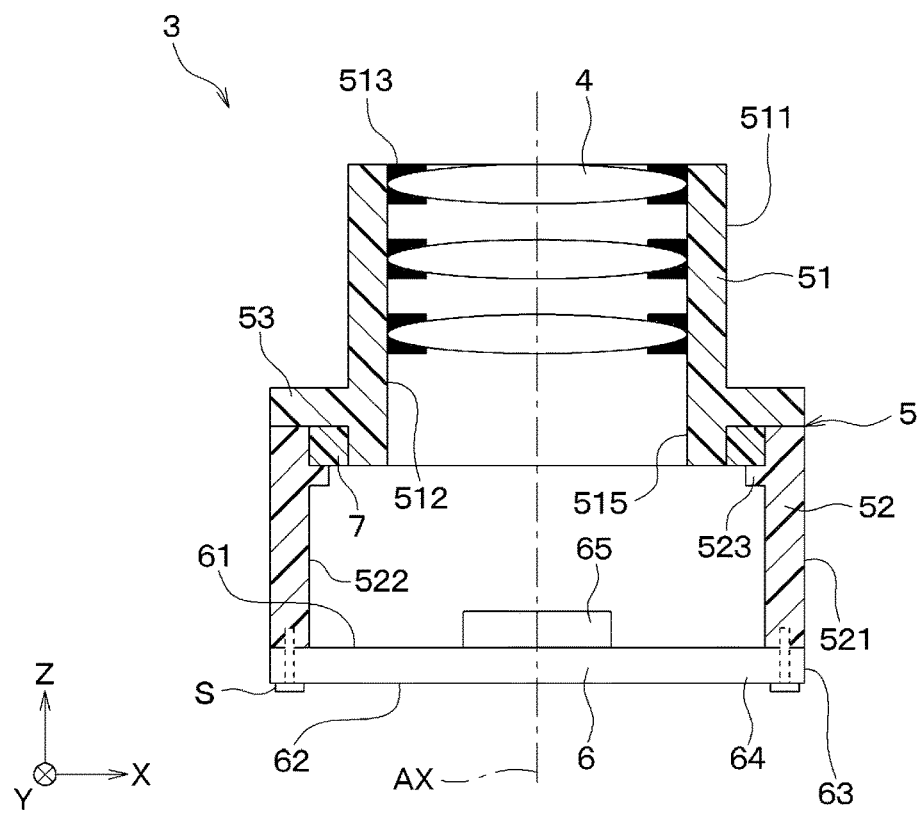
FIG. 5A is a cross-sectional view of a camera module according to yet another modification.
Figure 5B:
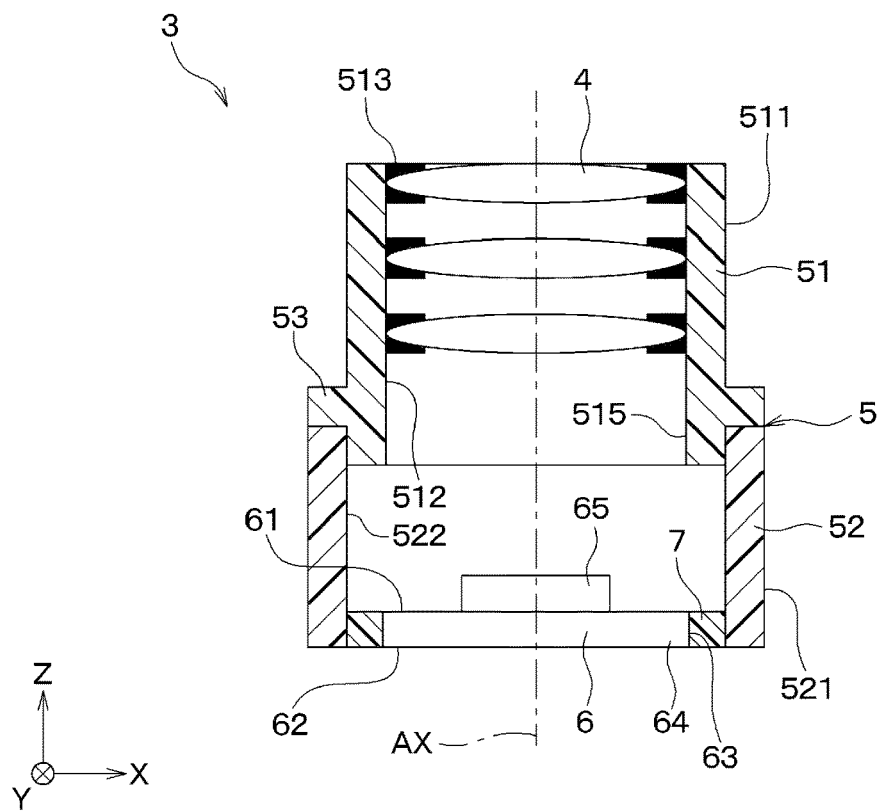
FIG. 5B is a cross-sectional view of a camera module according to still another modification.

Specifically, in the modification shown FIG. 5A, the lens-barrel part 51 of the lens holder 5 is formed of a resin colored by an ordinary black pigment that is transparent neither to visible light nor to ultraviolet light; therefore, the lens-barrel part 51 can block both visible light and ultraviolet light. A proximal end portion (i.e., an end portion on the side closer to the camera substrate 6 in the optical axis direction) 515 of the lens-barrel part 51 is received in the base part 52. The connecting part 53 is formed as a protrusion or flange that protrudes radially outward from the outer wall surface 511 of the lens-barrel part 51 in the vicinity of the proximal end portion 515. On the other hand, the base part 52 of the lens holder 5 is formed of a synthetic resin colored by a black pigment that is transparent to ultraviolet light, but not to visible light; therefore, the base part 52 can block visible light while allowing ultraviolet light to pass therethrough. A proximal end portion (i.e., an end portion on the side closer to the lenses 4) of the inner wall surface 522 of the base part 52 is radially joined by a joining member 7 to the proximal end portion 515 of the lens-barrel part 51, with a proximal end surface (i.e., the upper end surface in FIG. 5A) of the base part 52 facing the connecting part 53. That is, the joining member 7 is provided at a location where the lens-barrel part 51 and the base part 52 of the lens holder 5 are joined to each other. More specifically, the joining member 7 is radially interposed between the proximal end portion 515 of the lens-barrel part 51 and the base part 52. In other words, the proximal end portion 515 of the lens-barrel part 51 is provided so as to radially face the base part 52 through the joining member 7 interposed therebetween. In addition, the joining member 7 is formed of a UV-curable resin as in the above-described embodiment. The camera substrate 6 is fixed to the base part 52 of the lens holder 5 by screws S. Each of the screws S penetrates the camera substrate 6 in the plate thickness direction thereof (i.e., in the optical axis direction) and is fastened into the distal end portion (i.e., the lower end portion in FIG. 5A) of the base part 52.

With the configuration of the camera module 3 shown in FIG. 5A, in joining the lens-barrel part 51 and the base part 52 of the lens holder 5, although the joining member 7 is covered with the base part 52 and the connecting part 53, it is still possible to effectively cure the joining member 7 by irradiating ultraviolet light from outside of the base part 52 that has UV transparency. Moreover, at both the location where the lens-barrel part 51 and the base part 52 of the lens holder 5 are joined to each other and the location where the lens holder 5 and the camera substrate 6 are joined to each other, there is no structure with which deviation in the focus position is caused by cure shrinkage of an adhesive. Consequently, with the above configuration, it is possible to effectively suppress the performance of the camera module 3 from being lowered due to deviation in the focus position caused by cure shrinkage of an adhesive.

In addition, in the modification shown FIG. 5A, the base part 52 of the lens holder 5 may be seamlessly formed into one piece. Alternatively, the base part 52 of the lens holder 5 may be composed of two segments that are formed of different materials separately and then joined to each other in the optical axis direction; one of the two segments is formed of a material capable of blocking both visible light and ultraviolet light, whereas the other of the two segments is formed of a material capable of blocking visible light while allowing ultraviolet light to pass therethrough.

Furthermore, in the modification shown FIG. 5A, the lens holder 5 has a joining member-supporting protrusion 523 formed therein. Specifically, the joining member-supporting protrusion 523 is formed in the base part 52 of the lens holder 5 so as to protrude radially inward from the inner wall surface 522 of the base part 52. Further, the joining member-supporting protrusion 523 is formed continuously in the circumferential direction. In other words, the joining member-supporting protrusion 523 is formed over the entire circumference of the inner wall surface 522 of the base part 52. Furthermore, the joining member 7 is formed to adjoin the joining member-supporting protrusion 523 in the optical axis direction. Consequently, the joining member-supporting protrusion 523 can serve as an anti-drip protrusion to prevent dripping of the UV-curable resin (i.e., the joining member 7) before it is cured. As a result, with the joining member-supporting protrusion 523, it becomes possible to more reliably join the lens-barrel part 51 and the base part 52 of the lens holder 5 by the joining member 7.

In the modification shown in FIG. 5B, there is provided a predetermined fitting tolerance between the outer diameter of the lens-barrel part 51 and the inner diameter of the base part 52 so that the proximal end portion 515 of the lens-barrel part 51 can be inserted into the base part 52 with the outer wall surface 511 of the lens-barrel part 51 making sliding contact with the inner wall surface 522 of the base part 52. In this case, the proximal end portion 515 of the lens-barrel part 51 may be radially joined to the base part 52 by an adhesive. Alternatively, male threads may be formed on the outer wall surface 511 of the lens-barrel part 51 at the proximal end portion 515 thereof; female threads may be formed in that portion of the inner wall surface 522 of the base part 52 which radially faces the proximal end portion 515 of the lens-barrel part 51; and the proximal end portion 515 of the lens-barrel part 51 may be fastened into the base part 52 through engagement between the male threads and the female threads. In addition, in this modification, the base part 52 of the lens holder 5 has UV transparency; and the camera substrate 6 is joined by the joining member 7 to the base part 52 of the lens holder 5 as in the above-described embodiment.

Moreover, in the modification shown in FIG. 5B, the proximal end portion 515 of the lens-barrel part 51 is inserted into the base part 52 until the connecting part 53 is brought into contact with the proximal end surface (i.e., the upper end surface in FIG. 5B) of the base part 52. In addition, the lenses 4 may be mounted to the lens-barrel part 51 of the lens holder 5 before the lens-barrel part 51 is assembled to the base part 52 of the lens holder 5.

Furthermore, in the modification shown in FIG. 5B, the entire base part 52 of the lens holder 5 has UV transparency. Therefore, as in the modification shown in FIG. 5A, the proximal end portion 515 of the lens-barrel part 51 may be joined to the base part 52 by a joining member 7 that is formed of a UV-curable resin. In addition, it is unnecessary that the entire base part 52 of the lens holder 5 has UV transparency. In other words, the base part 52 of the lens holder 5 may be configured so that only a portion of the base part 52 in the optical axis direction has UV transparency.

Figure 6:
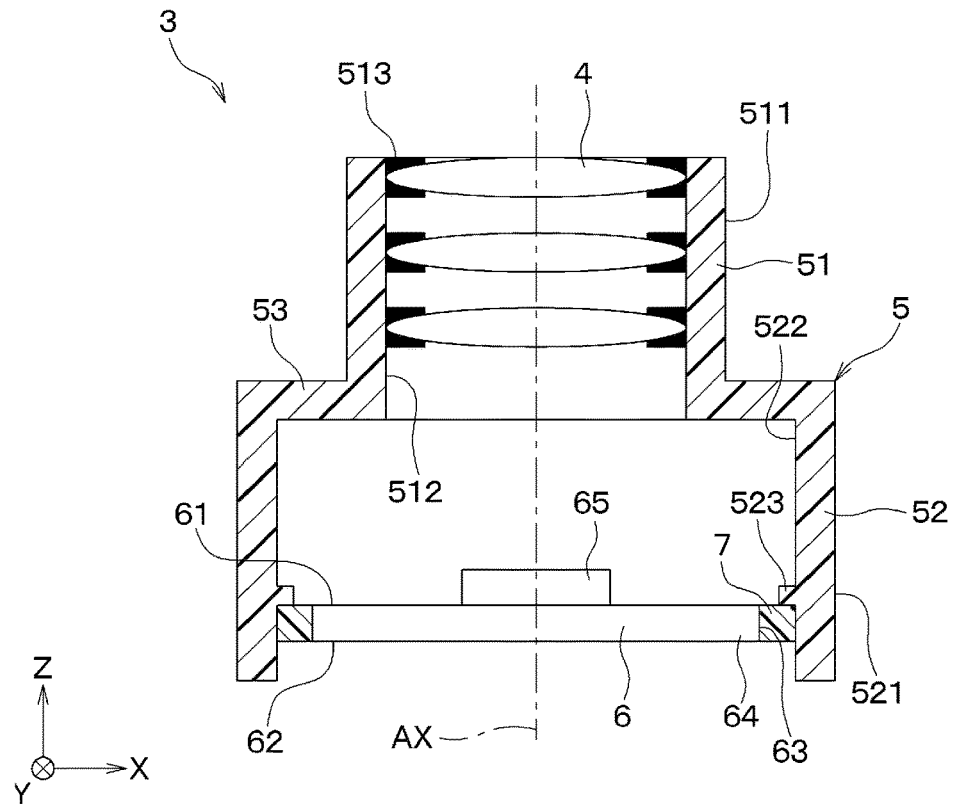
FIG. 6 is a cross-sectional view of a camera module according to yet another modification.

FIG. 6 illustrates a modification in which: the camera substrate 6 is joined by the joining member 7 to the base part 52 of the lens holder 5 as in the above-described embodiment; and the lens holder 5 has a joining member-supporting protrusion 523 formed therein. Specifically, the joining member-supporting protrusion 523 is formed in the base part 52 of the lens holder 5 so as to protrude radially inward from the inner wall surface 522 of the base part 52. Further, the joining member-supporting protrusion 523 is formed continuously in the circumferential direction. In other words, the joining member-supporting protrusion 523 is formed over the entire circumference of the inner wall surface 522 of the base part 52. Furthermore, the joining member 7 is formed to adjoin the joining member-supporting protrusion 523 in the optical axis direction. More specifically, the joining member-supporting protrusion 523 is located inside the joining member 7, i.e., closer to the lenses 4 than the joining member 7 is in the optical axis direction.

Figure 7:
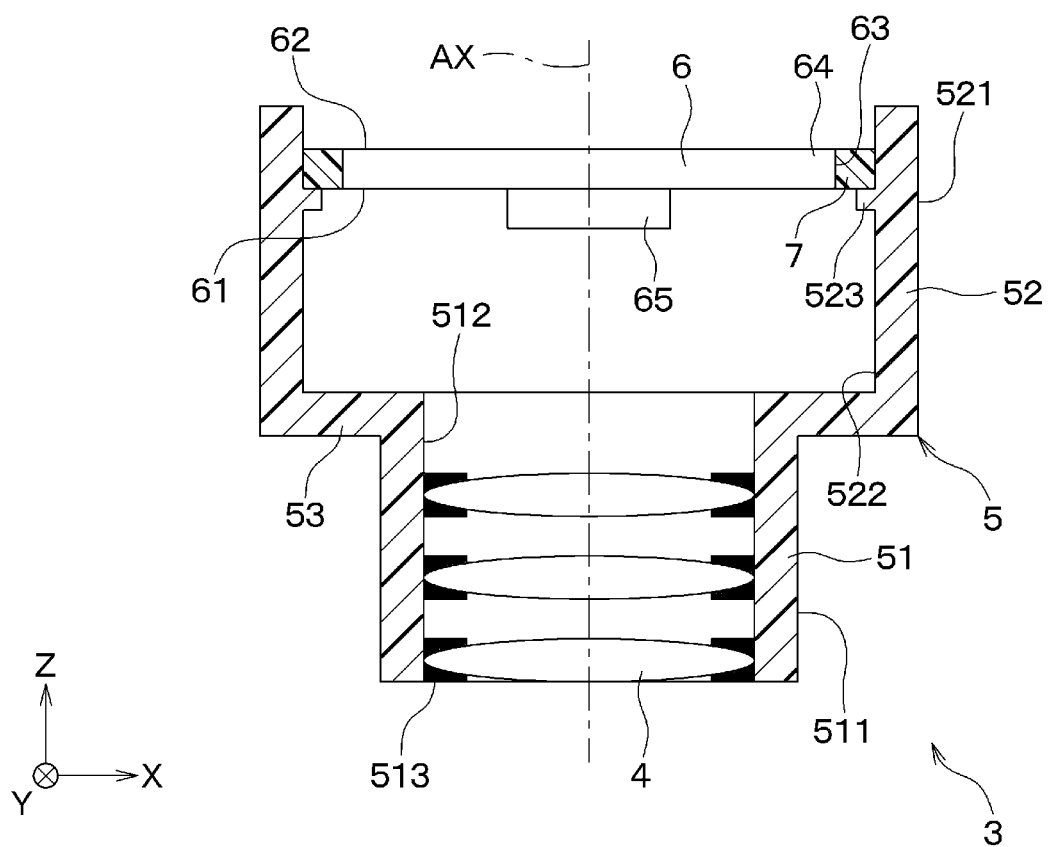
FIG. 7 is a cross-sectional view illustrating the assembling of the camera module shown in FIG. 6.

With the configuration of the camera module 3 shown in FIG. 6, the camera substrate 6 can be easily mounted to the lens holder 5. Moreover, as shown in FIG. 7, the joining member-supporting protrusion 523 can serve as an anti-drip protrusion to prevent dripping of the UV-curable resin (i.e., the joining member 7) before it is cured. As a result, with the joining member-supporting protrusion 523, it becomes possible to more reliably join the camera substrate 6 to the lens holder 5 by the joining member 7.

In the above-described embodiment and modifications, a plurality of components that are formed integrally with each other into one piece may alternatively be formed separately and then joined to each other. Conversely, a plurality of components that are formed separately and then joined to each other may alternatively be formed integrally with each other into one piece.

In the above-described embodiment and modifications, a plurality of components that are formed of the same material may alternatively be formed of different materials as appropriate. Conversely, a plurality of components that are formed of different materials may alternatively be formed of the same material as appropriate. In addition, the material for forming each component may be suitably selected from a plurality of candidate materials.

In the above-described embodiment and modifications, any component is not necessarily essential unless the component is specified as essential or is obviously essential in principle. Moreover, the present disclosure is not limited to any particular number, quantity or range mentioned in the above-described embodiment and modifications unless the number, quantity or range is specified as essential or is obviously essential in principle. Similarly, the present disclosure is not limited to any particular shape, size, direction or positional relationship mentioned in the above-described embodiment and modifications unless the shape, size, direction or positional relationship is specified as essential or is obviously essential in principle.

The present disclosure is not limited to the combinations of components illustrated in the above-described embodiment and modifications. Instead, the present disclosure may be implemented by various combinations. The present disclosure may include additional components which can be added to the above-described embodiment and modifications. The present disclosure encompasses components omitted from the above-described embodiment and modifications. The present disclosure also encompasses any replacement or combination of components between the above-described embodiment and modifications.

What is claimed is:

1. A camera module comprising:
   at least one lens having an optical axis;
   a camera substrate including an imaging element arranged on the optical axis of the at least one lens;
   a lens holder formed of a material not transparent to visible light, the lens holder having a lens-holding part and a base part, the lens-holding part being formed in a tubular shape around the optical axis and holding the at least one lens therein, the base part being also formed in a tubular shape around the optical axis and located closer to the camera substrate than the lens-holding part is in an optical axis direction in which the optical axis extends; and
   a joining member that is formed of a UV-curable resin and that joins the lens-holding part and the base part of the lens holder to each other,
   wherein:
   at least a facing portion of the lens holder, which faces the joining member, has UV transparency;
   the base part of the lens holder has a joining member-supporting protrusion formed to protrude in a direction intersecting the optical axis;
   the joining member adjoins the joining member-supporting protrusion in the optical axis direction;
   the joining member is interposed between a proximal end portion of the lens-holding part and the base part in the direction intersecting the optical axis such that the direction intersecting the optical axis passes through the proximal end portion, the joining member, and the base part, the proximal end portion being a camera-substrate-side end portion of the lens-holding part in the optical axis direction; and
   the joining member-supporting protrusion protrudes from the base part toward the proximal end portion of the lens-holding part in the direction intersecting the optical axis.

2. The camera module as set forth in claim 1, wherein:
   the lens-holding part of the lens holder has UV transparency; and the at least one lens is fixed, by a lens-fixing member that is formed of a UV-curable resin, to a lens-supporting wall surface of the lens-holding part of the lens holder, the lens-supporting wall surface being an inner wall surface of the lens-holding part which faces the optical axis.

3. The camera module as set forth in claim 2, wherein:
the lens-holding part of the lens holder has at least one lens-fixing protrusion formed to protrude from the lens-supporting wall surface of the lens-holding part toward the optical axis; and
the lens-fixing member adjoins the at least one lens-fixing protrusion in the optical axis direction.

4. The camera module as set forth in claim 1, wherein the camera module is configured to be mounted inside a windshield of a vehicle to capture images of an external environment of the vehicle.

5. The camera module as set forth in claim 1, wherein an inner wall surface of the joining member-supporting protrusion, which faces the optical axis, is located radially outside an outer wall surface of the proximal end portion of the lens-holding part.

6. A camera module comprising:
at least one lens having an optical axis;
a camera substrate including an imaging element arranged on the optical axis of the at least one lens;
a lens holder formed of a material not transparent to visible light, the lens holder having a lens-holding part and a base part, the lens-holding part being formed in a tubular shape around the optical axis and holding the at least one lens therein, the base part being also formed in a tubular shape around the optical axis and located closer to the camera substrate than the lens-holding part is in an optical axis direction in which the optical axis extends; and
a joining member formed of a UV-curable resin, the joining member being provided at a location where the camera substrate is joined to the base part of the lens holder in a direction intersecting the optical axis,
wherein:
at least a facing portion of the lens holder, which faces the joining member, has UV transparency;
the joining member joins an outer peripheral portion of the camera substrate to an inner wall surface of the base part of the lens holder;
the in-plane direction of the camera substrate is the direction intersecting the optical axis; and
the inner wall surface of the base part faces the optical axis.

7. The camera module as set forth in claim 6, wherein:
the lens-holding part of the lens holder has UV transparency; and
the at least one lens is fixed, by a lens-fixing member that is formed of a UV-curable resin, to a lens-supporting wall surface of the lens-holding part of the lens holder, the lens-supporting wall surface being an inner wall surface of the lens-holding part which faces the optical axis.

8. The camera module as set forth in claim 7, wherein:
the lens-holding part of the lens holder has at least one lens-fixing protrusion formed to protrude from the lens-supporting wall surface of the lens-holding part toward the optical axis; and
the lens-fixing member adjoins the at least one lens-fixing protrusion in the optical axis direction.

9. The camera module as set forth in claim 6, wherein the camera module is configured to be mounted inside a windshield of a vehicle to capture images of an external environment of the vehicle.

10. A camera module comprising:
at least one lens having an optical axis;
a camera substrate including an imaging element arranged on the optical axis of the at least one lens;
a lens holder formed of a material not transparent to visible light, the lens holder having a lens-holding part and a base part, the lens-holding part being formed in a tubular shape around the optical axis and holding the at least one lens therein, the base part being also formed in a tubular shape around the optical axis and located closer to the camera substrate than the lens-holding part is in an optical axis direction in which the optical axis extends; and
a joining member formed of a UV-curable resin and joining an outer peripheral portion of the camera substrate in an in-plane direction of the camera substrate to an inner wall surface of the base part of the lens holder, the in-plane direction of the camera substrate intersecting the optical axis, the inner wall surface of the base part facing the optical axis.

11. The camera module as set forth in claim 10, wherein:
the camera substrate has an element-supporting surface on which the imaging element is provided, and an end surface intersecting the element-supporting surface and included in the outer peripheral portion of the camera substrate; and
the joining member is interposed between the end surface of the camera substrate and the inner wall surface of the base part of the lens holder.

12. The camera module as set forth in claim 10, wherein in the lens holder, at least the base part has UV transparency.

13. The camera module as set forth in claim 10, wherein:
the base part of the lens holder has a joining member-supporting protrusion formed to protrude from the inner wall surface of the base part toward the optical axis; and
the joining member adjoins the joining member-supporting protrusion in the optical axis direction.

14. The camera module as set forth in claim 10, wherein:
the lens-holding part of the lens holder has UV transparency; and
the at least one lens is fixed, by a lens-fixing member that is formed of a UV-curable resin, to a lens-supporting wall surface of the lens-holding part of the lens holder, the lens-supporting wall surface being an inner wall surface of the lens-holding part which faces the optical axis.

15. The camera module as set forth in claim 14, wherein:
the lens-holding part of the lens holder has at least one lens-fixing protrusion formed to protrude from the lens-supporting wall surface of the lens-holding part toward the optical axis; and
the lens-fixing member adjoins the at least one lens-fixing protrusion in the optical axis direction.

16. The camera module as set forth in claim 10, wherein the camera module is configured to be mounted inside a windshield of a vehicle to capture images of an external environment of the vehicle.

* * * * *